United States Patent
Khonizi

(10) Patent No.: US 10,539,110 B2
(45) Date of Patent: Jan. 21, 2020

(54) VEHICLE BATTERY REPORTING AND AUTO-CHARGE

(71) Applicant: FORD GLOBAL TECHNOLOGIES, LLC, Dearborn, MI (US)

(72) Inventor: Mohammed Khonizi, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 15/437,021

(22) Filed: Feb. 20, 2017

(65) Prior Publication Data

US 2018/0238289 A1    Aug. 23, 2018

(51) Int. Cl.
F02N 11/08 (2006.01)
H04W 4/14 (2009.01)
G07C 5/00 (2006.01)

(52) U.S. Cl.
CPC ...... *F02N 11/0807* (2013.01); *F02N 11/0862* (2013.01); *G07C 5/008* (2013.01); *H04W 4/14* (2013.01); *F02N 2300/306* (2013.01)

(58) Field of Classification Search
CPC .. G07C 5/008; F02N 11/0862; F02N 11/0811; F02N 2300/306; F02N 11/0807; H04W 4/14; B60L 58/00; H04L 67/125; H04L 67/26; H04L 67/303
USPC .......................................................... 701/2
See application file for complete search history.

(56) References Cited

U.S. PATENT DOCUMENTS

| 8,258,948 | B2 | 9/2012 | Flick et al. |
| 9,060,213 | B2 | 6/2015 | Jones |
| 9,251,631 | B2* | 2/2016 | Thompson ............. G07C 5/008 |
| 2015/0330318 | A1* | 11/2015 | Petersen ................ G06Q 10/00 701/113 |

OTHER PUBLICATIONS

ITune Review, RSS ltd. CarLock Apps. Copyright 2016 Apple inc., 2016, pp. 1-3.*
CarLock Application by RS5 ltd, https://itunes.apple.com/us/app/carlock/id721180397?ls=1&mt=8, last accessed Jun. 22, 2016 (3 pages).
IF Application by IFTTT, https://www.moj.io/partners/, last accessed Jun. 24, 2016 (4 pages).

* cited by examiner

*Primary Examiner* — Muhammad Shafi
(74) *Attorney, Agent, or Firm* — Michael J. Spenner; Brooks Kushman P.C.

(57) ABSTRACT

A storage maintains charge times for vehicles. A processor of a server is programmed to periodically determine a time interval since each of the vehicles has been started according to the charge times. The server sends a message over a wide-area network requesting remote start of one of the vehicles responsive to the time interval for the one of the vehicles indicating no engine restart for at least a predefined time period. A processor of a vehicle restarts the vehicle according to receipt of a restart request sent responsive to a periodic process performed by a remote server to identify that a most recent vehicle start time sent from the vehicle to the remote server is at least a predefined time interval from a current time identified by the remote server.

19 Claims, 3 Drawing Sheets

VEHICLE BATTERY REPORTING AND AUTO-CHARGE

TECHNICAL FIELD

Aspects of the disclosure generally relate to reporting of vehicle battery charge times and automatic vehicle battery recharging requests.

BACKGROUND

A battery of a vehicle starts to discharge when the vehicle engine is turned off. Sometimes vehicles are left to sit for weeks at a time. However, the battery may become overly discharged if the battery is not recharged periodically, e.g., by restarting of the vehicle. The owner of the vehicle may return after several weeks and may find that the state of charge of the battery is insufficient to restart the vehicle.

SUMMARY

In one or more illustrative embodiments, a system includes a processor of a server, programmed to periodically determine a time interval since each of the vehicles has been started according to the restart times and send a message over a wide-area network requesting remote start of one of the vehicles responsive to the time interval for the one of the vehicles indicating no engine restart for at least a predefined time period.

In one or more illustrative embodiments, a method includes sending a vehicle start time to a remote server responsive to an engine event of a vehicle; and restarting the vehicle according to receipt of a restart request received from the remote server responsive to a periodic process performed by the remote server identifying that the engine event occurred at least a predefined period of time ago.

In one or more illustrative embodiments, a system includes a processor of a vehicle programmed to restart the vehicle according to receipt of a restart request sent responsive to a periodic process performed by a remote server to identify that a most recent vehicle start time sent from the vehicle to the remote server is at least a predefined time interval from a current time identified by the remote server.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Responsive to detection of a vehicle engine being turned on, a vehicle equipped with an embedded modem may send a trigger to a remote server to update a vehicle profile for the car with the current date and time. The server may periodically run a job to find out how long it has been since each vehicle has been started. If the vehicle has not been restarted for at least a predefined period of time, the server may send a notification to the vehicle owner to run the car remotely. For instance, the server may send a message to an application installed to the user's mobile device to cause the mobile device to indicate to the user that the vehicle should be started. The application may further provide an option allowing the user to remotely start the vehicle to recharge the battery. In other examples, the server may automatically direct the vehicle to remotely start, without driver involvement.

Figure 1:
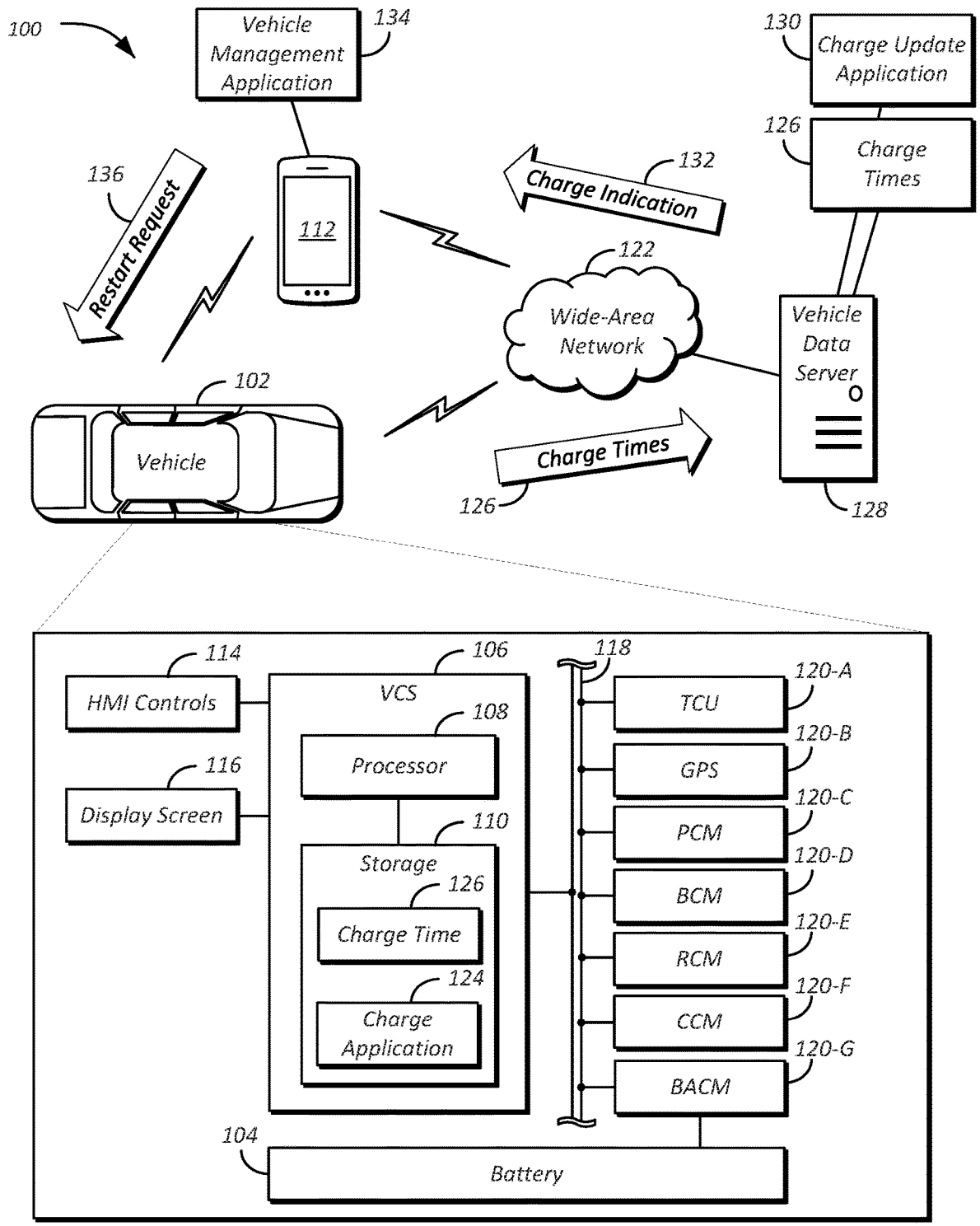
FIG. 1 illustrates an example system including a vehicle implementing battery reporting and automated recharging.

FIG. 1 illustrates an example system 100 including a vehicle 102 implementing battery 104 reporting and automated recharging. The vehicle 102 may include a vehicle computing system (VCS) 106 configured to communicate over a wide-area network 122, e.g., using a mobile device 112 or a telematics control unit (TCU) 120-A. The system also includes a vehicle data server 128 configured to maintain vehicle charge times 126 received over the wide-area network 122 from the vehicle 102. The vehicle data server 128 may execute a charge application 124 configured to send a charge indication 138 to a vehicle management application 134 of the mobile device 112 associated with the vehicle 102 to be recharged. The mobile device 112 may further provide an indication to the user requesting the recharge, and if approved, may send a restart request 136 to the vehicle 102. The VCS 106 may be configured to utilize a charge application 124 installed to the VCS 106 to report the vehicle charge times 126 to the vehicle data server 128, and to respond to restart requests 136 to recharge the vehicle 102 battery. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The battery 104 may include various types of rechargeable batteries configured to supply electric energy to various components of the vehicle 102. In an example, the battery 104 may be a 12 Volt lead-acid battery. The battery 104 may be configured to power a starter motor and ignition system of an engine of the vehicle 102 when the engine is not running, and may receive electric charge from an alternator when the engine is running. In another example, the battery 104 may include a traction battery or battery pack configured to store energy that can be used by one or more electric machines of the vehicle 102 that can provide propulsion and deceleration capability, whether the engine is turned on or off.

The VCS 106 may be configured to support voice command and BLUETOOTH interfaces with the driver and driver carry-on devices, receive user input via various buttons or other controls, and provide vehicle status information to a driver or other vehicle 102 occupants. An example VCS 106 may be the SYNC system provided by FORD MOTOR COMPANY of Dearborn, Mich.

The VCS 106 may further include various types of computing apparatus in support of performance of the functions of the VCS 106 described herein. In an example, the VCS 106 may include one or more processors 108 configured to execute computer instructions, and a storage 110 medium on which the computer-executable instructions and/or data may be maintained. A computer-readable storage medium (also referred to as a processor-readable medium or storage 110) includes any non-transitory (e.g., tangible) medium that participates in providing data (e.g., instructions) that may be read by a computer (e.g., by the processor(s)). In general, a processor 108 receives instructions and/or data, e.g., from the storage 110, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc.

The VCS 106 may be configured to communicate with mobile devices 112 of the vehicle occupants. The mobile devices 112 may be any of various types of portable computing devices, such as cellular phones, tablet computers, smart watches, laptop computers, portable music players, or other devices capable of communication with the VCS 106. As with the VCS 106, the mobile device 112 may include one or more processors configured to execute computer instructions, and a storage medium on which the computer-executable instructions and/or data may be maintained. In many examples, the VCS 106 may include a wireless transceiver (e.g., a BLUETOOTH controller, a ZIGBEE transceiver, a Wi-Fi transceiver, etc.) configured to communicate with a compatible wireless transceiver of the mobile device 112. Additionally, or alternately, the VCS 106 may communicate with the mobile device 112 over a wired connection, such as via a USB connection between the mobile device 112 and a USB subsystem of the VCS 106.

The VCS 106 may also receive input from human-machine interface (HMI) controls 114 configured to provide for occupant interaction with the vehicle 102. For instance, the VCS 106 may interface with one or more buttons or other HMI controls 114 configured to invoke functions on the VCS 106 (e.g., steering wheel audio buttons, a push-to-talk button, instrument panel controls, etc.). The VCS 106 may also drive or otherwise communicate with one or more displays 116 configured to provide visual output to vehicle occupants, e.g., by way of a video controller. In some cases, the display 116 may be a touch screen further configured to receive user touch input via the video controller, while in other cases the display 116 may be a display only, without touch input capabilities. In an example, the display 116 may be a head unit display included in a center console area of the vehicle 102 cabin. In another example, the display 116 may be a screen of a gauge cluster of the vehicle 102.

The VCS 106 may be further configured to communicate with other components of the vehicle 102 via one or more in-vehicle networks 118 or vehicle buses 118. The in-vehicle networks 118 may include one or more of a vehicle controller area network (CAN), an Ethernet network, and a media oriented system transfer (MOST), as some examples. The in-vehicle networks 118 may allow the VCS 106 to communicate with other vehicle 102 systems, such as a vehicle modem of the TCU 120-A (which may not be present in some configurations), a global positioning system (GPS) module 120-B configured to provide current vehicle 102 location and heading information, and various other vehicle ECUs configured to cooperate with the VCS 106. As some non-limiting possibilities, the vehicle ECUs may include a powertrain control module (PCM) 120-C configured to provide control of engine operating components (e.g., idle control components, fuel delivery components, emissions control components, etc.) and monitoring of engine operating components (e.g., status of engine diagnostic codes); a body control module (BCM) 120-D configured to manage various power control functions such as exterior lighting, interior lighting, keyless entry, remote start, and point of access status verification (e.g., closure status of the hood, doors and/or trunk of the vehicle 102); a radio transceiver module (RCM) 120-E configured to communicate with key fobs or other local vehicle 102 devices; a climate control management (CCM) 120-F module configured to provide control and monitoring of heating and cooling system components (e.g., compressor clutch and blower fan control, temperature sensor information, etc.); and a battery control module (BACM) 120-G configured to monitor the state of charge or other parameters of the battery 104 of the vehicle 102.

The wide-area network 122 may include one or more interconnected communication networks such as the Internet, a cable television distribution network, a satellite link network, a local area network, a wide area network, and a telephone network, as some non-limiting examples. Using an embedded modem of the VCS 106 (or a mobile device 112 of the user connected to the VCS 106), the vehicle 102 may be able to send outgoing data from the vehicle 102 to network destinations on the wide-area network 122, and receive incoming data to the vehicle 102 from network destinations on the wide-area network 122.

The TCU 120-A may include a cellular modem or other network transceiver configured to facilitate communication over the wide-area network 122 between the vehicle 102 and other devices of the system 100. In an example, the VCS 106 may be configured to access the communications features of the TCU 120-A by communicating with the TCU 120-A over a vehicle bus 118. As some examples, the vehicle bus 118 may include a controller area network (CAN) bus, an Ethernet bus, or a MOST bus. In other examples, the VCS 106 may access the wide-area network 122 using the communications services of the mobile device 112. In an example, the VCS 106 may communicate with the mobile device 112 over a local area connect (e.g., BLUETOOTH), and the mobile device 112 in turn communicates over the wide-area network 122 using a cellular modem of the mobile device 112.

The charge application 124 may be one application included on the storage 110 of the VCS 106. The charge application 124 may include instructions that, when executed by the processor of the VCS 106, cause the VCS 106 to provide vehicle charge times 126 from the vehicle 102 to the vehicle data server 128.

The vehicle data server 128 may be configured to maintain the vehicle charge times 126 indicative of the last time that the vehicle 102 was charged. The vehicle charge times 126 may indicate, a time at which the vehicle 102 was most recently started, a time at which the vehicle 102 was most recently stopped, a duration of the most recent run of the vehicle 102, as some possibilities. In other examples, the vehicle charge times 126 may be indicative of times at which the battery 104 achieves a predefined state of charge (e.g., falls below a predefined state of charge threshold). In some instances, the precision of the vehicle charge times 126 may be to the nearest day, while in other cases, the precision of the vehicle charge times 126 may be to the hour, minute, and/or second.

The vehicle data server 128 may further maintain a charge update application 130. The charge update application 130 may include instructions that, when executed by a processor of the vehicle data server 128, cause the vehicle data server 128 to send charge indications 132 to request that the vehicle 102 be restarted.

The charge update application 130 may periodically execute a job to identify a time difference between the current time and the most recent vehicle charge times 126 for each vehicle 102 reporting to the vehicle data server 128. Responsive to identifying a vehicle 102 that has not been restarted for at least a predefined period of time, the charge update application 130 may cause the vehicle data server 128 to send a charge indication 132. The charge indication 132 may be sent, in an example, to the vehicle owner, to a fleet manager of the vehicle 102, to a registered driver of the vehicle 102, etc.

The charge indication 132 may indicate to the recipient to start the vehicle 102 remotely. For instance, the charge update application 130 may send the charge indication 132 to a vehicle management application 134 installed to the user's mobile device 112, to cause the mobile device 112 to indicate to the user that the vehicle 102 should be started. The vehicle management application 134 may further provide an option allowing the user to remotely start the vehicle 102 to recharge the battery 104. For instance, the vehicle management application 134 may display a user interface to a display of the mobile device 112, including a control that, when selected, causes the vehicle management application 134 to direct the mobile device 112 to send a restart request 136 to the vehicle 102. In other examples, the charge update application 130 may cause the vehicle data server 128 to automatically direct the vehicle 102 to start remotely, without driver involvement. In such an example, the charge update application 130 may send the restart request 136 instead of sending the charge indication 132 to the mobile device 112.

Figure 2:
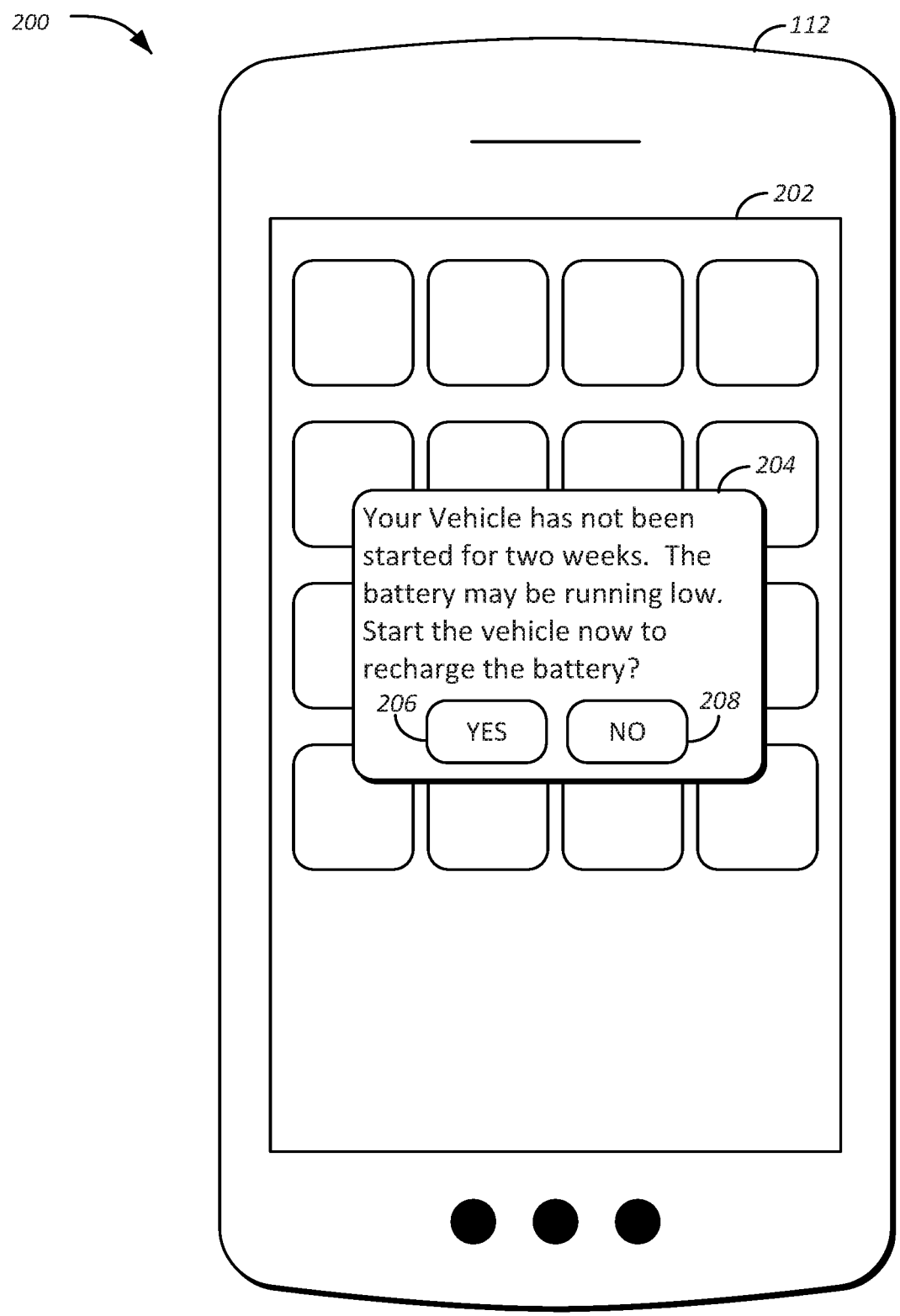
FIG. 2 illustrates an example user interface of the mobile device for displaying a charge recommendation.

FIG. 2 illustrates an example user interface 200 of the mobile device 112 for displaying a charge recommendation 204. The user interface 200 may be presented by the vehicle management application 134 to a display 202 of the mobile device 112, responsive to receipt of the charge indication 132 from the vehicle data server 128.

As shown, the charge recommendation 204 includes a description suggesting that the vehicle 102 should be charged. The charge recommendation 204 also includes a yes or assent control 206 that, when selected by the user, causes a charge indication 132 to be sent to the vehicle 102. The charge recommendation 204 also includes a no or dismiss control 208 that, when selected by the user, dismisses the charge recommendation 204 without sending the charge indication 132 to the vehicle 102.

Figure 3:
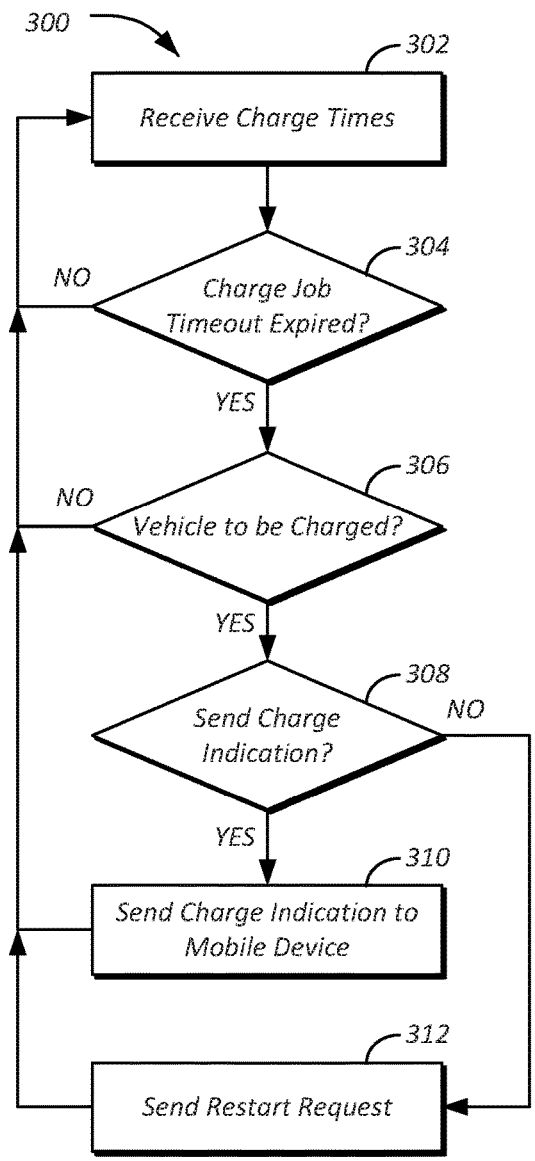
FIG. 3 illustrates an example process for performing vehicle battery reporting and charging.

FIG. 3 illustrates an example process 300 for performing vehicle battery 104 reporting and charging. In an example, the process 300 may be performed by the vehicle data server 128 in the context of the system 100.

At operation 302, the vehicle data server 128 receives charge times 126 from the vehicles 102. In an example, the vehicle data server 128 receives the charge times 126 from various vehicles 102 over the wide-area network 122 responsive to and/or indicative of one or more of a time at which the vehicle 102 was most recently started, a time at which the vehicle 102 was most recently stopped, a duration of the most recent run of the vehicle 102, as some possibilities. In some examples, a vehicle 102 utilizes an embedded modem of the TCU 120-A to provide the charge times 126. In other examples, a vehicle 102 utilizes communication features of a mobile device 112 of the user located within the vehicle 102 to provide the charge times 126.

At 304, the vehicle data server 128 determines whether a charge job timeout has expired. In an example, the charge update application 130 of the vehicle data server 128 periodically executes a job to identify a time difference between the current time and the most recent vehicle charge times 126 for each vehicle 102 reporting to the vehicle data server 128. The predefined timeout may be, in an example, every day, week, or two weeks. If the charge timeout has expired, control passes to operation 306. Otherwise, control returns to operation 302.

The vehicle data server 128 determines which vehicles 102 are to be charged at 306. In an example, the vehicle data server 128 identifies charge times 126 older than a predefined threshold. For instance, the charge update application 130 of the vehicle update server 128 compares the most recent vehicle charge times 126 for each vehicle 102 reporting to the vehicle data server 128 to a predefined threshold time. As one possibility, the predefined threshold may be two weeks old. If one or more of the charge times 126 are older than the predefined threshold, control passes to operation 308. Otherwise, control returns to operation 302.

At operation 308, the vehicle data server 128 determines whether to send charge indications 132 to the vehicles 102 to be charged. In an example, the vehicle data server 128 may maintain information indicative of which vehicles 102 are set up to receive restart requests 316 without sending charge indications 132 to mobile devices 112, and which vehicles 102 require charge indications 132 instead. If a vehicle 102 receives charge indications 132, control passes to operation 310. If a vehicle 102 receives restart requests 136, control passes to operation 312.

The charge indication 132 is sent from the vehicle data server 128 at 310. In an example, the charge update application 130 of the vehicle update server 128 accesses data indicative of identifiers of mobile devices 112 associated with the vehicles 102 to be charged. As one possibility, the vehicle data server 128 may maintain phone numbers of associated mobile devices 112 that correspond to the vehicles 102, and may send the charge indication 132 as a short message service (SMS) message to the mobile device 112. In another example, the vehicle data server 128 may maintain information indicative of a user account corresponding to the vehicle 102, and may send the charge indication 132 to that account to be retrieved by a mobile device 112 also connected to the same user account. After operation 310, control returns to operation 302.

At 312, the vehicle data server 128 sends the restart request 136. In an example, the vehicle data server 128 sends the restart request 136 to a telematics server providing remote services to the vehicle 102, and the telematics service validates the request and sends the restart request 136 to the vehicle 102. In other examples, the vehicle data server 128 sends the restart request 136 directly to an account, phone number, Internet protocol (IP) address, or other identifier of the vehicle 102. After operation 312, control passes to operation 302.

It should be noted, for example, that multiple restart requests 136 may be sent to a single vehicle 102 based on the same charge time 126. For instance, a mobile device 112 may receive a first reminder and not act on the reminder, and at the next periodic check at operations 304-310 may receive a second reminder.

Figure 4:
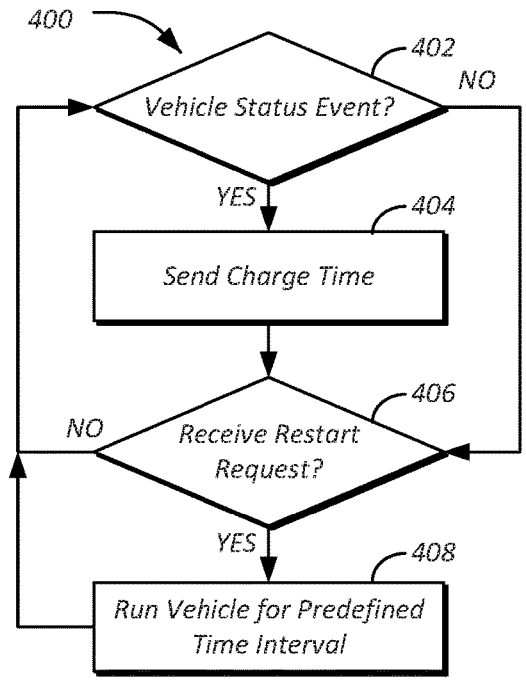
FIG. 4 illustrates an example process for a vehicle configured to perform vehicle battery reporting and charging.

FIG. 4 illustrates an example process 400 for a vehicle 102 configured to perform vehicle battery 104 reporting and charging. In an example, the process 400 may be performed by the vehicle 102 in the context of the system 100.

At operation 402, the vehicle 102 determines whether a vehicle 102 status event has occurred. In an example, the vehicle 102 may determine whether one or more vehicle 102 was started or stopped. If so, control passes to operation 404. Otherwise, control remains at 402.

At 404, the vehicle 102 sends a charge time 126 message to the vehicle data server 128. In an example, the vehicle 102 captures the current time, and send the current time in a charge time 126 message to the vehicle data server 128. The current time may be captured with a precision to the nearest day, while in other cases, the precision of the vehicle charge times 126 may be to the hour, minute, and/or second.

The vehicle 102 determines whether a restart request 136 has been received at 406. In an example, the vehicle 102 may receive restart requests 136 via SMS. In another example, the vehicle 102 may receive restart requests 136 from a telematics server configured to provide secure command provisioning to vehicles 102. If a restart request 136 is received, control passes to operation 408. Otherwise, control returns to operation 402.

At 408, the vehicle 102 runs the engine for a predefined time interval. In an example, the vehicle 102 may perform a remote start, and may run for a predefined time interval. In some cases, the predefined time interval is the same as the time interval used by the vehicle 102 to turn off the vehicle 102 when remote start is activated from a key fob but the user never enters the vehicle 102 and completes the start sequence. As one possibility, the predefined time interval may be ten minutes. Or, the predefined time interval may be longer than the remote start interval, and may be, e.g., twenty or thirty minutes. After operation 408, control returns to operation 402. It should be noted that running of the engine at 408 may further trigger a vehicle status event at operation 402, thereby sending a new charge time 126 message at operation 404.

Figure 5:
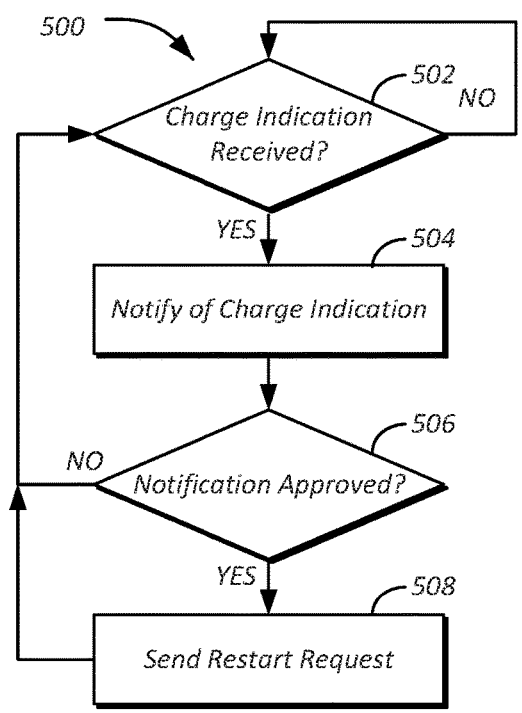
FIG. 5 illustrates an example process for a mobile device configured to facilitate vehicle battery charging.

FIG. 5 illustrates an example process 500 for a mobile device 112 configured to facilitate vehicle battery 104 charging. In an example, the process 500 may be performed by the vehicle mobile device 112 in the context of the system 100.

At 502, the mobile device 112 determines whether a charge indication 132 has been received. In an example, the mobile device 112 may receive an SMS message from the vehicle data server 128 including the charge indication 132. In another example, the vehicle data server 128 may maintain information indicative of a user account corresponding to the vehicle 102, and may send the charge indication 132 to that account to be retrieved by a mobile device 112 also connected to the same user account. The mobile device 112 may accordingly receive the charge indication 132 from the account. If a charge indication 132 is received, control passes to operation 504. Otherwise, control remains at operation 502.

At operation 504, the mobile device 112 notifies of the received charge indication 132. An example notification of the received charge indication 132 is illustrated with respect to the user interface 200.

At 506, the mobile device 112 determines whether the notification of the charge indication 132 is approved. In an example, the mobile device 112 may receive user input to the yes or assent button 206 of the user interface 200. If so, control passes to operation 508. If not, e.g., a timeout of the charge indication 132 occurs or the mobile device 112 receives user input to the no or dismiss control 208 of the user interface 200, control passes to operation 502. In some examples, if the user dismisses the charge indication 132, the charge indication 132 may be redisplayed to the user at a later time (e.g., after a predetermined timeout such as an hour, four hours, or a day).

The mobile device 112 sends a restart request 136 to the vehicle 102 at 508. In an example, the mobile device 112 sends the restart request 136 to a telematics server providing remote services to the vehicle 102, and the telematics service validates the request and sends the restart request 136 to the vehicle 102. In other examples, the mobile device 112 sends the restart request 136 directly to an account, phone number, Internet protocol (IP) address, or other identifier of the vehicle 102. After operation 508, control passes to operation 502.

Variations on the system 100 are possible. In an example, the functionality of the vehicle data server 128, e.g., receipt of charge times 126, execution of charge update application 130, determination of charge indications 132, etc., may be performed in whole or part by the mobile device 112. Such an example may allow for the mobile device 112 to determine and present information to the user to facilitate vehicle battery 104 charging, without requiring use of the vehicle data server 128.

Computing devices described herein, such as the VCS 106, mobile device 112, ECUs 120, and vehicle data server 128, generally include computer-executable instructions where the instructions may be executable by one or more computing devices such as those listed above. Computer-executable instructions, such as those of the charge application 124, charge update application 130, and vehicle management application 134, may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a storage maintaining restart times for vehicles; and
a processor of a server, programmed to periodically determine a time interval since each of the vehicles has been started according to the restart times and send a message over a wide-area network requesting remote start of one of the vehicles responsive to the time interval for the one of the vehicles indicating a lack of restart for at least a predefined time period, wherein the predefined time period is a time interval programmed to the vehicles to automatically shut down responsive to lack of completion of a remote start sequence activated from a key fob.

2. The system of claim 1, wherein the message is a charge indication sent to a vehicle management application of a mobile device linked to an account of the one of the vehicles, the charge indication configured to cause the mobile device to request user assent to restart the one of the vehicles.

3. The system of claim 1, wherein the message is a restart request configured to cause the one of the vehicles to automatically restart.

4. The system of claim 1, wherein the message is a text message sent to a mobile device linked to an account of the one of the vehicles.

5. The system of claim 1, wherein the processor is further programmed to determine the time interval since each of the vehicles has been started using a time-scheduled job service of the server.

6. The system of claim 1, wherein the restart times include time and date that an engine of the one of the vehicles was most recently started.

7. The system of claim 1, wherein the restart times include time and date that an engine of the one of the vehicles was most recently stopped.

8. A method comprising:
sending a vehicle start time to a remote server responsive to an engine event of a vehicle; and
restarting the vehicle according to receipt of a restart request received from the remote server responsive to a periodic process performed by the remote server identifying that the engine event occurred at least a predefined period of time ago, wherein the predefined period of time is a time interval programmed to the vehicle to automatically shut down responsive to lack of completion of a remote start sequence activated from a key fob.

9. The method of claim 8, further comprising receiving the restart request from a telematics server commanded by the remote server.

10. The method of claim 8, further comprising receiving the restart request from a telematics server commanded by a mobile device linked to an account of the vehicle and receiving a charge indication from the remote server responsive to the server identifying that a most recent vehicle start time is at least a predefined time interval from a current time.

11. The method of claim 10, further comprising commanding the telematics server by the mobile device responsive to receiving user assent to restart the vehicle via an interface of the mobile device, the interface being displayed by the mobile device responsive to receipt by the mobile device of the charge indication.

12. The method of claim 8, further comprising executing the periodic process according to a job initiated by a time-based scheduler of the remote server.

13. The method of claim 8, further comprising automatically turning off the vehicle a predetermined period of time subsequent to the restarting.

14. The method of claim 13, wherein the predetermined period of time is a time interval programmed to the vehicle to automatically turn off the vehicle responsive to lack of completion of a remote start sequence.

15. The method of claim 8, wherein the engine event is engine start.

16. The method of claim 8, wherein the engine event is engine shutdown.

17. The method of claim 8, wherein the engine event is achievement of a predefined state of charge of a vehicle battery.

18. A system comprising:
a processor of a vehicle programmed to restart the vehicle according to receipt of a restart request sent responsive to a periodic process performed by a remote server to identify that a most recent vehicle start time sent from the vehicle to the remote server is at least a predefined time interval from a current time identified by the remote server,
wherein the predefined time interval is a time interval programed to the vehicle to automatically shut down responsive to lack of completion of a remote start sequence activated from a key fob.

19. The system of claim 18, wherein the processor is further programmed to automatically turn off the vehicle a predetermined period of time subsequent to the restart.

* * * * *